United States Patent
Yan

(10) Patent No.: US 9,239,419 B2
(45) Date of Patent: Jan. 19, 2016

(54) NARROW BORDER BACKLIGHT MODULE AND MANUFACTURING METHOD THEREOF

(71) Applicants: AU Optronics (Xiamen) Corp., Xiamen (CN); Au Optronics Corporation, Hsin-Chu (TW)

(72) Inventor: Hua-Sheng Yan, Xiamen (CN)

(73) Assignees: AU OPTRONICS (XIAMEN) CORPORATION, Xiamen (CN); AU OPTRONICS CORPORATION, Hsin-Chu (TW)

( * ) Notice: Subject to any disclaimer, the term of this patent is extended or adjusted under 35 U.S.C. 154(b) by 95 days.

(21) Appl. No.: 14/144,628

(22) Filed: Dec. 31, 2013

(65) Prior Publication Data
US 2014/0204607 A1    Jul. 24, 2014

(30) Foreign Application Priority Data
Jan. 24, 2013   (CN) .......................... 2013 1 0055672

(51) Int. Cl.
*F21V 8/00*         (2006.01)
*G02B 6/00*        (2006.01)

(52) U.S. Cl.
CPC ............ *G02B 6/0031* (2013.01); *G02B 6/0021* (2013.01); *G02B 6/0065* (2013.01); *G02B 6/0068* (2013.01); *G02B 6/0073* (2013.01); *G02B 6/0088* (2013.01)

(58) Field of Classification Search
CPC .. G02B 6/0021; G02B 6/0031; G02B 6/0065; G02B 6/0068; G02B 6/0073; G02B 6/0088
See application file for complete search history.

(56) References Cited

U.S. PATENT DOCUMENTS

| | | | |
|---|---|---|---|
| 2006/0120112 A1* | 6/2006 | Lin ....................... | G02B 6/0021 362/626 |
| 2008/0089096 A1* | 4/2008 | Lin ....................... | G02B 6/0055 362/622 |
| 2010/0289979 A1* | 11/2010 | Lee ................... | G02F 1/133308 349/58 |

FOREIGN PATENT DOCUMENTS

| | | |
|---|---|---|
| CN | 101226294 | 7/2008 |
| CN | 201141959 | 10/2008 |
| TW | 200717098 | 10/2005 |
| TW | 200819849 | 5/2008 |
| TW | I354838 | 12/2011 |

* cited by examiner

*Primary Examiner* — Karabi Guharay
*Assistant Examiner* — Nathaniel Lee
(74) *Attorney, Agent, or Firm* — WPAT, PC; Justin King

(57) ABSTRACT

A narrow border backlight module includes a frame, a reflective isolation layer, and a light guide element. The frame includes a plural of sidewalls connected to each other, and the bottom of the frame is hollow. The sidewalls define a cavity. The reflective isolation layer is disposed on an inner surface facing the cavity of the sidewalls. The light guide element is formed inside the frame, and the light guide element and the frame are integrally formed.

9 Claims, 10 Drawing Sheets

NARROW BORDER BACKLIGHT MODULE AND MANUFACTURING METHOD THEREOF

RELATED APPLICATIONS

This application claims priority to Chinese Application Serial Number 201310055672.8, filed Jan. 24, 2013, which is herein incorporated by reference.

BACKGROUND

1. Field of Invention

The present invention relates to a backlight module. More particularly, the present invention relates to a narrow border backlight module.

2. Description of Related Art

Liquid crystal displays (LCD) have the advantages of high resolution, compactness, light weight, a low required drive voltage, low power consumption, and the ability to be used in a wide range of applications. As a result, LCDs have been widely applied to portable TVs, mobile phones, video recorders, notebook computers, desktop monitors, and other consumer electronics. Indeed, LCDs have become the most widely used display configuration.

The conventional LCD includes the main components of a frame, an LCD panel, a printed circuit board, and a backlight module. The LCD panel is electrically connected to the printed circuit board by a flexible printed circuit board. The current trend is to make the LCD compact. One consequence of this has been that the frame of the LCD is becoming thinner and thinner.

The backlight module of an LCD generally includes a holder, light sources, and at least one optical film. These components are usually manufactured separately, then assembled together to form the backlight module. Therefore, not only is assembly time increased, but the yield rate is decreased due to inaccurate positioning occurring during assembly.

SUMMARY

This disclosure provides a narrow border backlight module to improve assembly efficiency and reduce the thickness of the frame.

In one embodiment, a narrow border backlight module is provided. The narrow border backlight module includes a frame, a reflective isolation layer, and a light guide element. The frame includes a plurality of sidewalls connected to each other. The bottom of the frame is hollow, and the sidewalls define a cavity. The reflective isolation layer is disposed on an inner surface facing the cavity of the sidewalls. The light guide element is formed inside the frame, and the light guide element and the frame are integrally formed.

In one or more embodiments, a receiving space is defined between one side surface of the light guide element and the frame, and the narrow border backlight module further includes a light emitting unit disposed in the receiving space.

In one or more embodiments, the light emitting unit includes a circuit substrate and a plurality of the light emitting diodes on the circuit substrate. The receiving space includes a plurality of grooves, and the light emitting diodes are respectively disposed in these grooves.

In one or more embodiments, the thickness of the light guide element is smaller than the height of the frame.

In one or more embodiments, the light guide element includes a light exiting surface and a bottom surface opposing the light exiting surface, and the light guide element further includes a plurality of microstructure disposed on the bottom surface.

In one or more embodiments, the narrow border backlight module further includes a reflective layer disposed on the bottom surface.

In one or more embodiments, the narrow border backlight module further includes a protrusion connected to the frame and horizontally disposed on the light guide element, and the protrusion includes a first engaging portion. The narrow border backlight module further includes at least one optical film, and the optical film includes a second engaging portion corresponding to the first engaging portion. The optical film is fixed on the light guide element by engaging the first engaging portion and the second engaging portion.

A method for manufacturing a narrow border backlight module is provided. The method for manufacturing the narrow border backlight module includes: providing a strip-shaped metal sheet, in which a reflective isolation layer is disposed on the surface of the strip-shaped metal sheet; bending the strip-shaped metal sheet to form a frame, in which the frame is an enclosed structure, the bottom of the frame is hollow, and the frame defines a cavity; putting the frame into a mold; injecting a polymeric light guide material into the mold and the cavity, so as to integrally form a light guide element in the frame; and separating the frame integrally formed with the light guide element from the mold.

In one or more embodiments, the mold includes a microstructure mold having microstructures, so as to form a plurality of microstructures corresponding to the microstructures of the microstructure mold on a bottom surface of the light guide element.

In one or more embodiments, the mold includes a mold protrusion, so as to form a receiving space between a side surface of the light guide element and the frame, and a light emitting unit is accommodated in the receiving space.

In one or more embodiments, the method for manufacturing the narrow border backlight module further includes: bending a protrusion connected to the strip-shaped metal sheet, so as to horizontally dispose the protrusion on the light guide element; and fixing an optical film on the light guide element by engaging a first engaging portion of the protrusion and a second engaging portion of the optical film.

Through the insert molding process, in addition to integrally forming the light guide element in the frame, a receiving space and microstructures on the bottom surface are formed together in the light guide element, so as to integrate the manufacturing process and reduce assembly time. The thickness of the frame of the backlight module made by the method is substantially equal to the thickness of the sheet, so that the thickness of the frame of the backlight module is effectively reduced. Furthermore, a reflective isolation layer is disposed on the inner surface of the frame, so as to effectively prevent short circuits resulting from direct contact between the circuit on the display panel and the metal frame.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
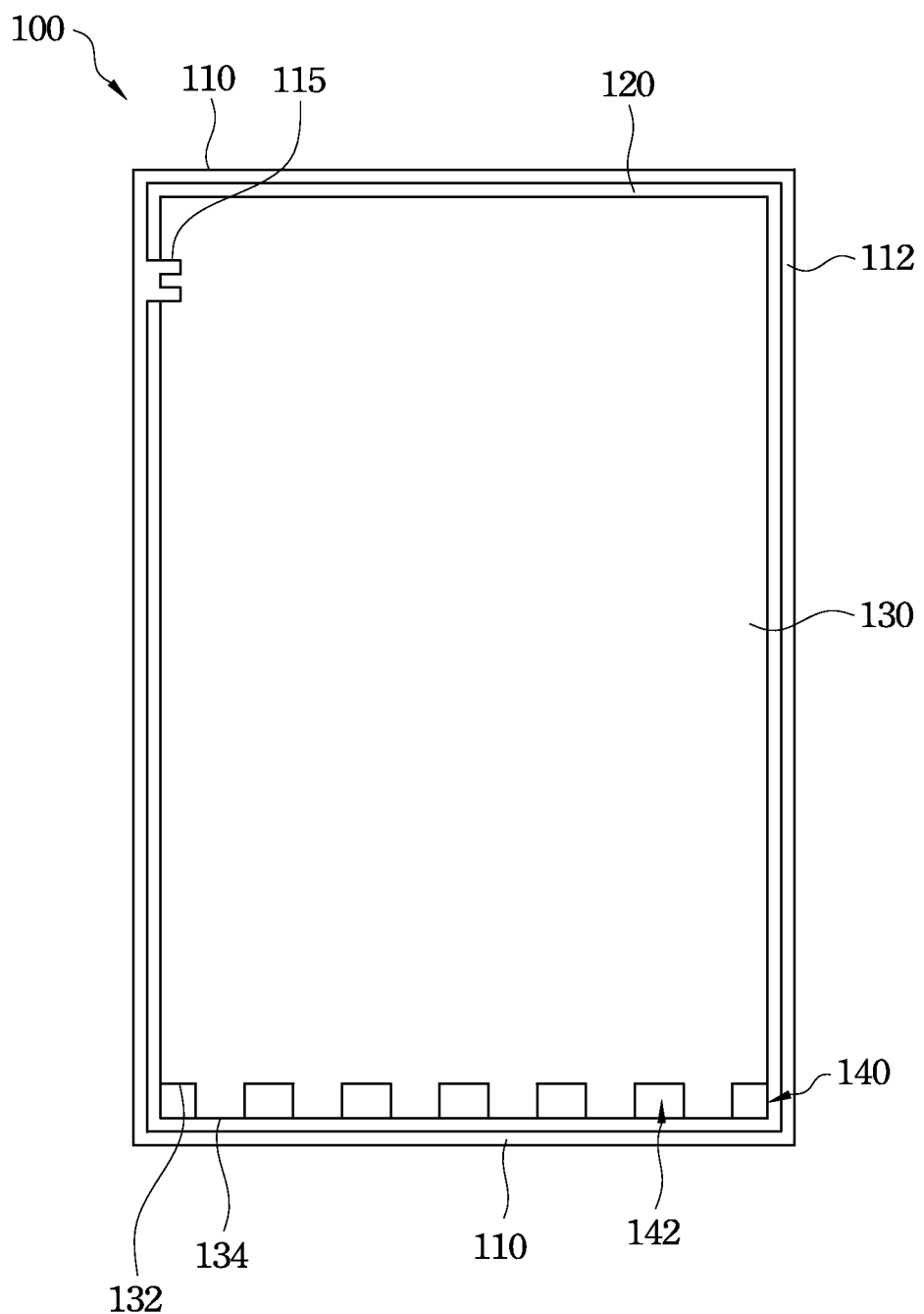
FIG. 1 is a top view of a narrow border backlight module according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Reference is made first to FIG. 1. FIG. 1 is a top view of a narrow border backlight module according to one embodiment of this invention. A narrow border backlight module 100 includes a frame 110, a reflective isolation layer 120 disposed on the frame 110, and a light guide element 130 integrally formed with the frame 110. The frame 110 is made by bending a strip-shaped metal sheet. In other words, the frame 110 is formed by sidewalls 112 connecting to each other, and the bottom of the frame 110 is hollow and without a bottom board. The sidewalls 120 define a cavity, and the light guide element 130 is disposed in the cavity.

The reflective isolation layer 120 is disposed on the inner surface of the frame 110. Specifically, the reflective isolation layer 120 is disposed on the surface of the sidewalls 112 facing the cavity. The reflective isolation layer 120 is an isolation layer of the frame 110 which functions to prevent a short circuit resulting from direct contact between a circuit on a display panel and the metal frame 110. Additionally, the color of the reflective isolation layer 120 can be white or another bright color, so that light that is leaving can be reflected back to the light guide element 130 by the reflective isolation layer 120, thereby increasing the light utilization rate.

The light guide element 130 is formed in the frame 110, and the light guide element 130 and the frame 110 are integrally formed. The light guide element 130 and the frame 110 with the reflective isolation layer 120 can be made by insert molding. Since the reflective isolation layer 120 disposed on the inner surface of the frame 110 contacts polymeric light guide materials that are at a high temperature during the insert molding process, the reflective isolation layer 120 is heat-resistant in some embodiments. The reflective isolation layer 120 can be heat-resistant isolative paint, such as organic silicon paint.

A receiving space 140 is formed between one side surface 132 of the light guide element 130 and the frame 110, so as to accommodate a light emitting unit. The side surface 132 facing the receiving space 140 of the light guide element 130 can be a concave and convex surface. The side surface 132 includes a plurality of raised portions 134, each pair of which is provided with a predetermined spacing therebetween, and the receiving space 140 includes a plurality of grooves 142 located between the raised portions 134. At least part of the side surface 132 facing the receiving space 140 of the light guide element 130 does not contact the frame 110, so as to define the space for the grooves 142, and the other part of the light guide element 130 may or may not contact the frame 110. For example, the raised portions 134 contact the frame 110 in FIG. 1, but in other embodiments, the raised portions 134 do not contact the frame 110.

Because the light guide element 130 and the frame 110 are integrally formed, the process of assembling a light guide board in the frame 110 is omitted, and problems with respect to inaccurate positioning during assembly are avoided. Additionally, because the thickness of the frame 110 is determined by the thickness of the metal sheets, the thickness of the frame 110 of the backlight module 100 is reduced.

The frame 110 can further include a protrusion 115. The protrusion 115 can be stamped with the strip-shaped metal sheet, that is, the protrusion 115 and the frame 110 are integrally formed, and then the protrusion 115 is bent, so as to horizontally dispose the protrusion 115 on the upper surface of the light guide element 130. The protrusion 115 is used for fixing an optical film as described below.

Figure 2:
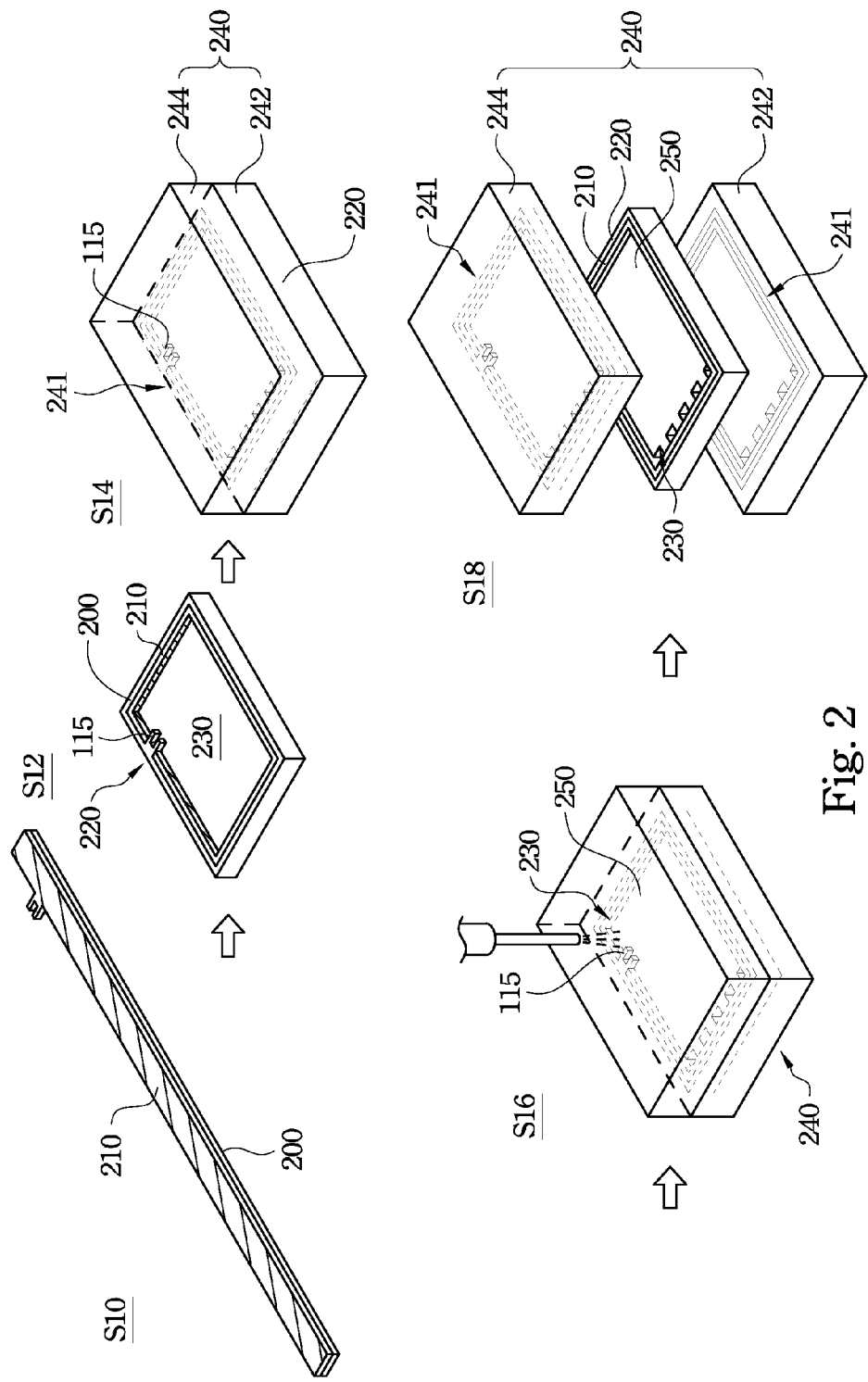
FIG. 2 is a schematic view illustrating various steps involved in manufacturing the narrow border backlight module according to one embodiment of this invention.

FIG. 2 is a schematic view illustrating various steps involved in manufacturing the narrow border backlight module according to one embodiment of this invention. In step S10, a strip-shaped metal sheet 200 is provided, and a reflective isolation layer 210 is disposed on a surface of the strip-shaped metal sheet.

In Step S12, the strip-shaped metal sheet 200 is bent to form a frame 220. The frame 220 is an enclosed structure, and the frame 220 is rectangular. The shape of the frame 220 is not limited as described herein. The frame 220 defines a cavity 230, and the reflective isolation layer 210 is disposed on the inner surface of the frame 220 facing the cavity 230.

In Step S14, the frame 220 is put into a mold 240. The mold 240 includes at least a male mold 242 and a female mold 244. The interior of the male mold 242 and the female mold 244 includes an accommodation trough 241, and the frame 220 is put in the accommodation trough 241 of the mold 240. Specifically, the frame 220 is put in the interior space defined by the accommodation trough 241 of the male mold 242 and the female mold 244.

In Step S16, a polymeric light guide material is injected into the interior space of the mold 240 and the cavity 230, so as to integrally form a light guide element 250 in the frame 220. The polymeric light guide material can be transparent resin, such as polymethyl methacrylate (PMMA), but the material of the polymeric light guide material is not limited as described herein.

In Step S18, the frame 220 and the light guide element 250 integrally formed with the frame 220 are separated from the mold 240, so as to obtain the frame 220 and the light guide element 250 in a state integrally formed with each other. The light guide element 250 can be formed with a plurality of cavities 230, so as to provide a receiving space 260 needed by the light emitting unit.

The strip-shaped metal sheet 200 can further include a protrusion 115, and the protrusion 115 is connected to and extends from the strip-shaped metal sheet 200. In step S12, when the strip-shaped metal sheet 200 is bent, the protrusion 115 can be bent as well, such that the protrusion 115 is horizontally disposed in the cavity 230. The protrusion 115 can also be bent after step S18. That is, the protrusion 115 may be bent after integrally forming the frame 220 with the light guide element 250, such that the protrusion 115 is horizontally disposed on the upper surface of the light guide element 320.

Figure 3:
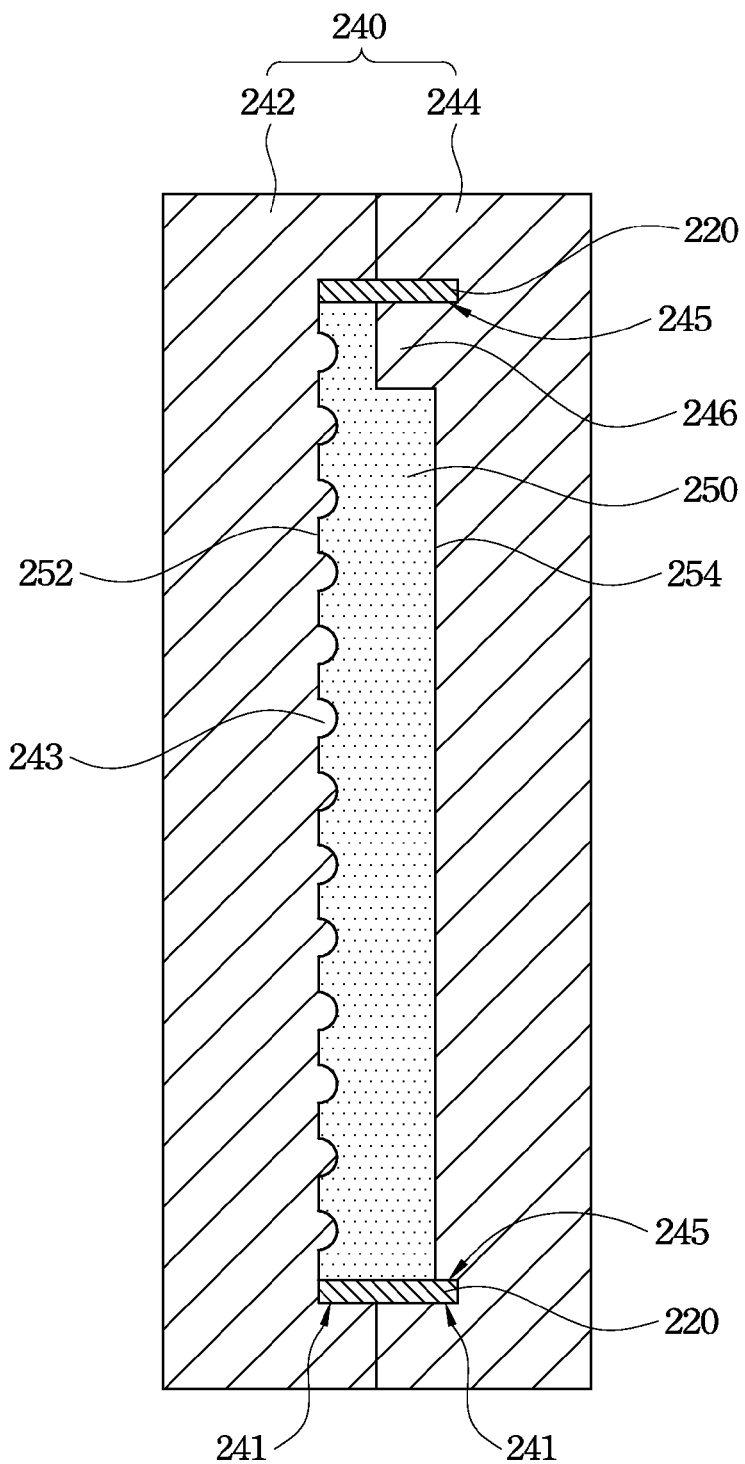
FIG. 3 is a cross-sectional view of the narrow border backlight module shown in a state positioned in a mold.

Reference is now made to FIG. 3. FIG. 3 is a cross-sectional view of the narrow border backlight module shown in a state positioned in the mold. The mold 240 includes the male mold 242 and the female mold 244. The male mold 242 and the female mold 244 include the accommodation trough 241 and define the interior space for accommodating the frame 220. The light guide element 250 includes a bottom surface 252 and a light exiting surface 254. The bottom surface 252 and the light exiting surface 254 are two opposing surfaces with largest areas of the light guide element 250. The male mold 242 opposes one side of the bottom surface 252 of the light guide element 250, and the female mold 244 opposes one side of the light exiting surface 254 of the light guide element 250.

The female mold 244 includes a ring-shaped groove 245, and the size of the ring-shaped groove 245 can correspond to that of the frame 220, such that the frame 220 can be placed in the ring-shaped groove 245 and fixed therein. Because part of the frame 220 is received in the ring-shaped groove 245, the thickness of the light guide element 250 is slightly smaller than the height of the frame 220.

The male mold 242 includes a plurality of embossments 243. The female mold 244 includes a plurality of mold protrusions 246. The mold protrusions 246 are disposed on one bottom side of the female mold 244. The mold protrusions 246 correspond to the grooves 142 of the receiving space 140. When the polymeric light guide material is injected into the cavity 230 between the mold 240 and the frame 220, as a result of the structure of the male mold 242 and the female mold 244, a predetermined pattern is formed on the light guide element 250.

Through the insert molding process, the light guide element 250 is integrally formed inside the frame 220, and the receiving space 260 of the light guide element 250 and a microstructure 258 on the bottom surface 252 are formed at the same time. Hence, manufacturing process integration and assembly time reduction are realized.

Figure 4:
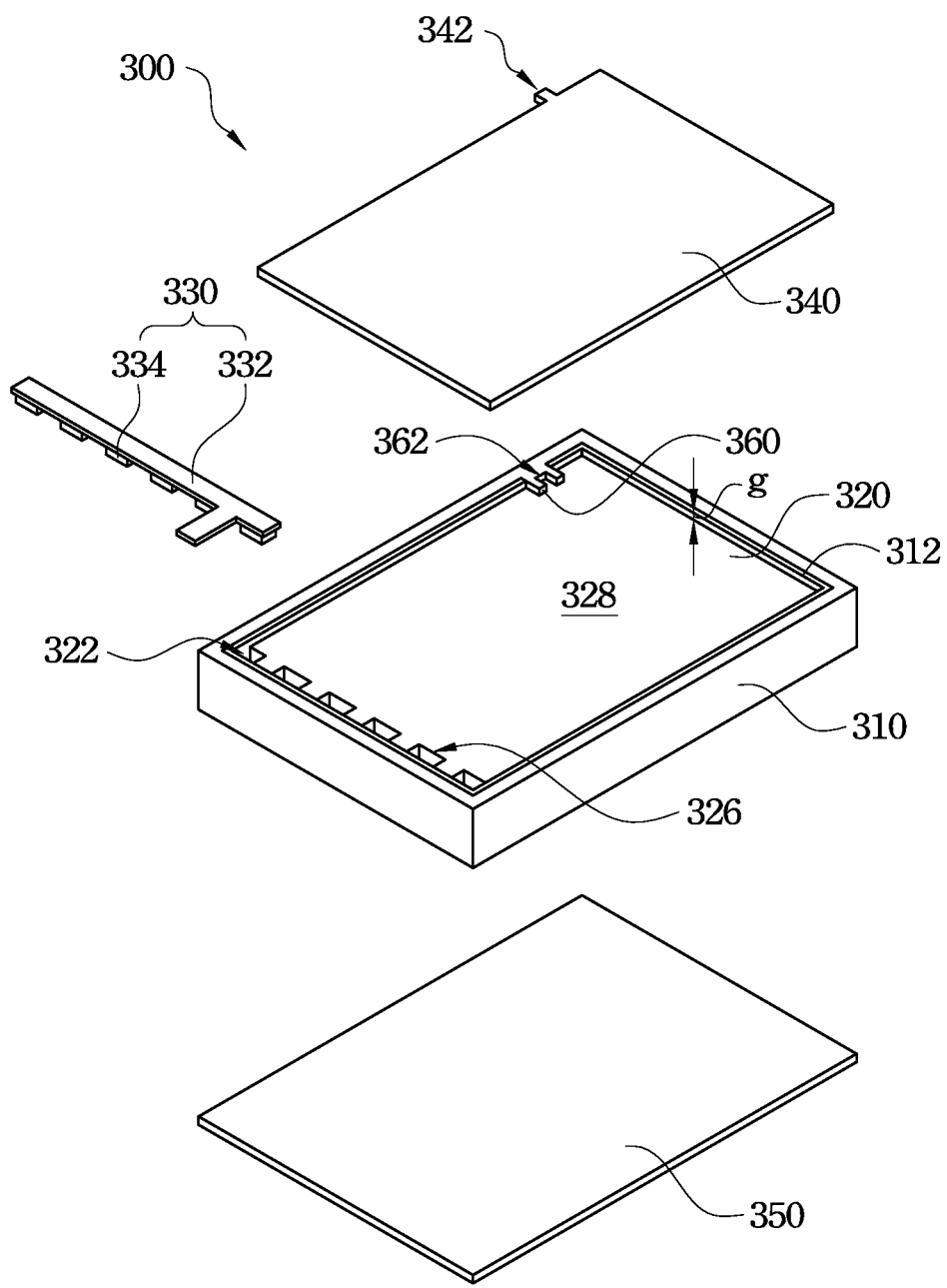
FIG. 4 is an exploded perspective view of the narrow border backlight module according to another embodiment of this invention.
Figure 5:
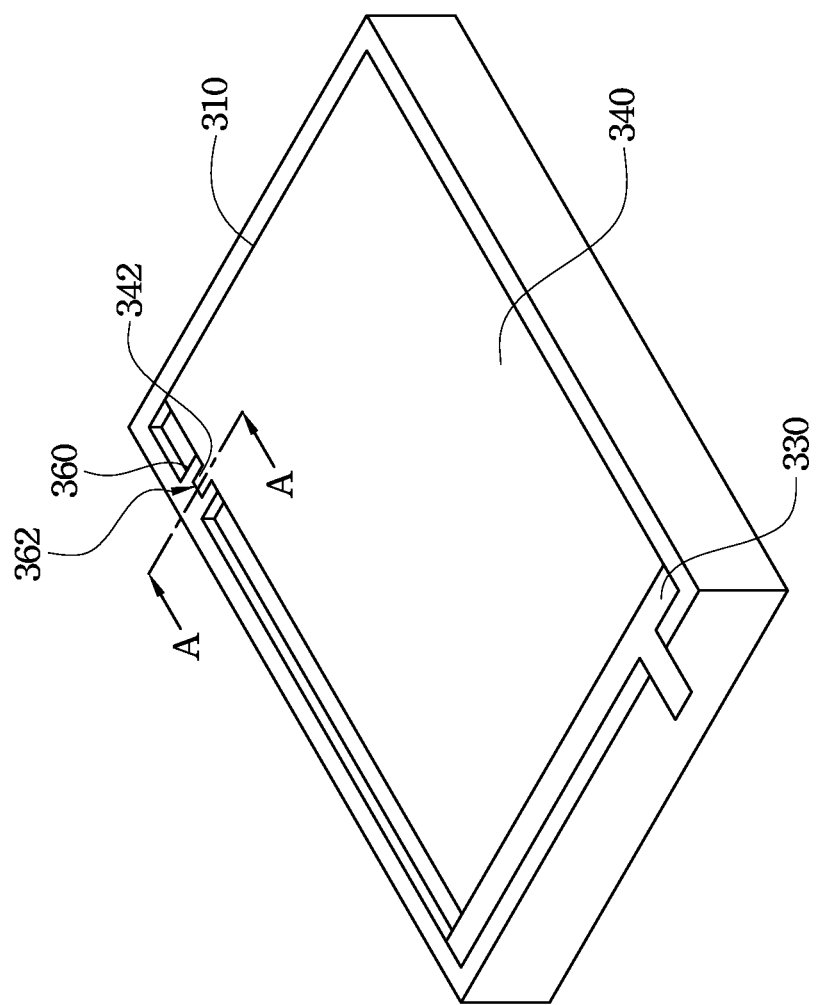
FIG. 5 is a schematic perspective view of the narrow border backlight module according to another embodiment of this invention.

Reference is made subsequently to FIG. 4 and FIG. 5. FIG. 4 is an exploded perspective view of the narrow border backlight module according to another embodiment of this invention, and FIG. 5 is a schematic perspective view of the narrow border backlight module according to another embodiment of this invention. The narrow border backlight module 300 includes a frame 310, a light guide element 320 integrally formed in the frame 310, a light emitting unit 330, at least one optical film 340, and a reflective layer 350. The light guide element 320 can be integrally formed with the frame 310 by the insert molding process. The upper surface of the light guide element 320 and the upper surface of the frame 310 have a height difference g therebetween, and this height difference g can be used for accommodating the optical film 340.

The light guide element 320 includes a receiving space 322, and the light emitting unit 330 is accommodated in the receiving space 322. The receiving space 322 includes a plurality of grooves 326. The light emitting unit 330 includes a circuit substrate 332 and a plurality of light emitting diodes 334 disposed on the circuit substrate 332. When the light emitting unit 330 is disposed in the receiving space 322, the light emitting diodes 334 are embedded in the grooves 326, so as to fix the light emitting diodes 334. Light emitted by the light emitting diodes 334 enters the light guide element 320, so that the light is guided by the light guide element 320 and leaves from a light exiting surface 328.

The reflective layer 350 is disposed on the bottom surface of the light guide element 320. The bottom surface opposes the light exiting surface 328. In this embodiment, the reflective layer 350 is a reflective board disposed under the light guide element 320. In other embodiments, the reflective layer 350 can be reflective paint painted on the bottom surface of the light guide element 320. In still other embodiments, the reflective layer 350 can be reflective paint that is painted on the male mold before the polymeric light guide material is injected, and the reflective paint sticks on the light guide element 320 after the polymeric light guide material is injected. The reflective layer 350 is used for reflecting the light emitted from the light guide element 320 back to the light exiting surface 328, such that the light utilization rate is increased.

The optical film 340 is disposed on the frame 310 and the light guide element 320. In order to fix the optical film 340 on the frame 310 and the light guide element 320, the narrow border backlight module 300 further includes a protrusion 360, and the protrusion 360 is connected to the frame 310 and is located above the light guide element 320. Specifically, the protrusion 360 and the frame 310 are cut from the same metal sheet. In other words, the protrusion 360 is connected to and extends from the strip-shaped metal sheet 200, and the protrusion 360 is bent and horizontally disposed above the light guide element 320, so as to fix the optical film 340.

The protrusion 360 includes a first engagement portion 362, and the first engagement portion 362 can be a notch. The optical film 340 includes a second engagement portion 342 disposed corresponding to the first engagement portion 362, and the second engagement portion 342 can be a protuberance. The optical film 340 can be fixed to the light guide element 320 by engaging the first engagement portion 362 and the second engagement portion 342. The shapes of the first engagement portion 362 and the second engagement portion 342 can be as disclosed in this embodiment, but are not limited in this regard. It is required only that the second engagement portion 342 of the optical film 340 engage the first engagement portion 362 of the protrusion 360. The shape of the first engagement portion 362 may or may not correspond to the shape of the second engagement portion 342, as long as the optical film 340 is fixed to the frame 310.

Figure 6:
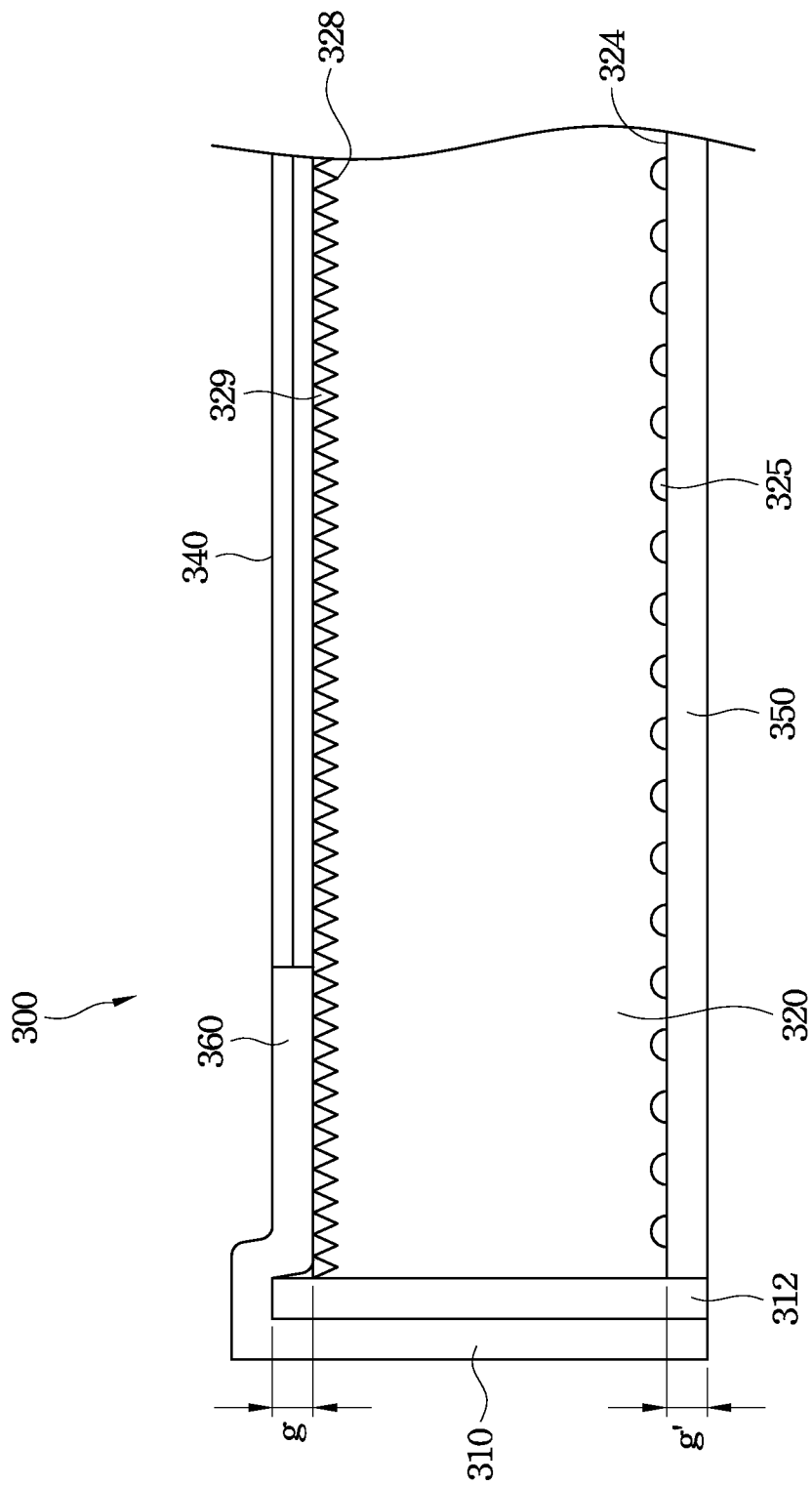
FIG. 6 is a cross-sectional view taken along line A-A of FIG. 5.

Reference is now made to FIG. 6. FIG. 6 is a cross-sectional view taken along line A-A of FIG. 5. This view includes the frame 310, the light guide element 320 disposed in the frame 310, that is, the light guide element 320 is surrounded by the frame 310, the optical film 340 disposed on the light guide element 320, and the reflective layer 350 on the bottom surface of the light guide element 320. The reflective isolation layer 312 is disposed on the surface of the frame 310 facing the light guide element 320.

The light guide element 320 is formed inside the frame 310, and the light guide element 320 and the frame 310 are integrally formed. The light guide element 320 includes the light exiting surface 328 and the bottom surface 324 opposing each other. A plurality of V-shaped microstructures 329 are disposed on the light exiting surface 328, so as to diffuse light uniformly. The bottom surface 324 includes concave microstructures 325, so as to destroy the total reflection in the light guide element 320. The V-shaped microstructures 329 and the concave microstructures 325 can be formed by disposing corresponding microstructures first in the male mold 242 and the female mold 244, and then by performing the insert molding process. In other embodiments, the V-shaped microstructures and the concave microstructures can be carved directly by lasers.

The thickness of the light guide element 320 is slightly smaller than the height of the frame 310, such that a height difference g is formed between the light exiting surface 328 of the light guide element 320 and the upper surface of the frame 310, and further such that a height difference g' is formed between the bottom surface 324 of the light guide element 320 and the bottom surface of the frame 310. The height difference g is larger than or approximately equals the thickness of the protrusion 360, for accommodating the optical film 340, and the height difference g' approximately equals the thickness of reflective layer 350. The protrusion 360 can be bent from the frame 310 and contact the light guide element 320. The optical film 340 is fixed to the protrusion 360 of the frame 310 by the engagement of the first engagement portion 362 and the second engagement portion 342.

Figure 7:
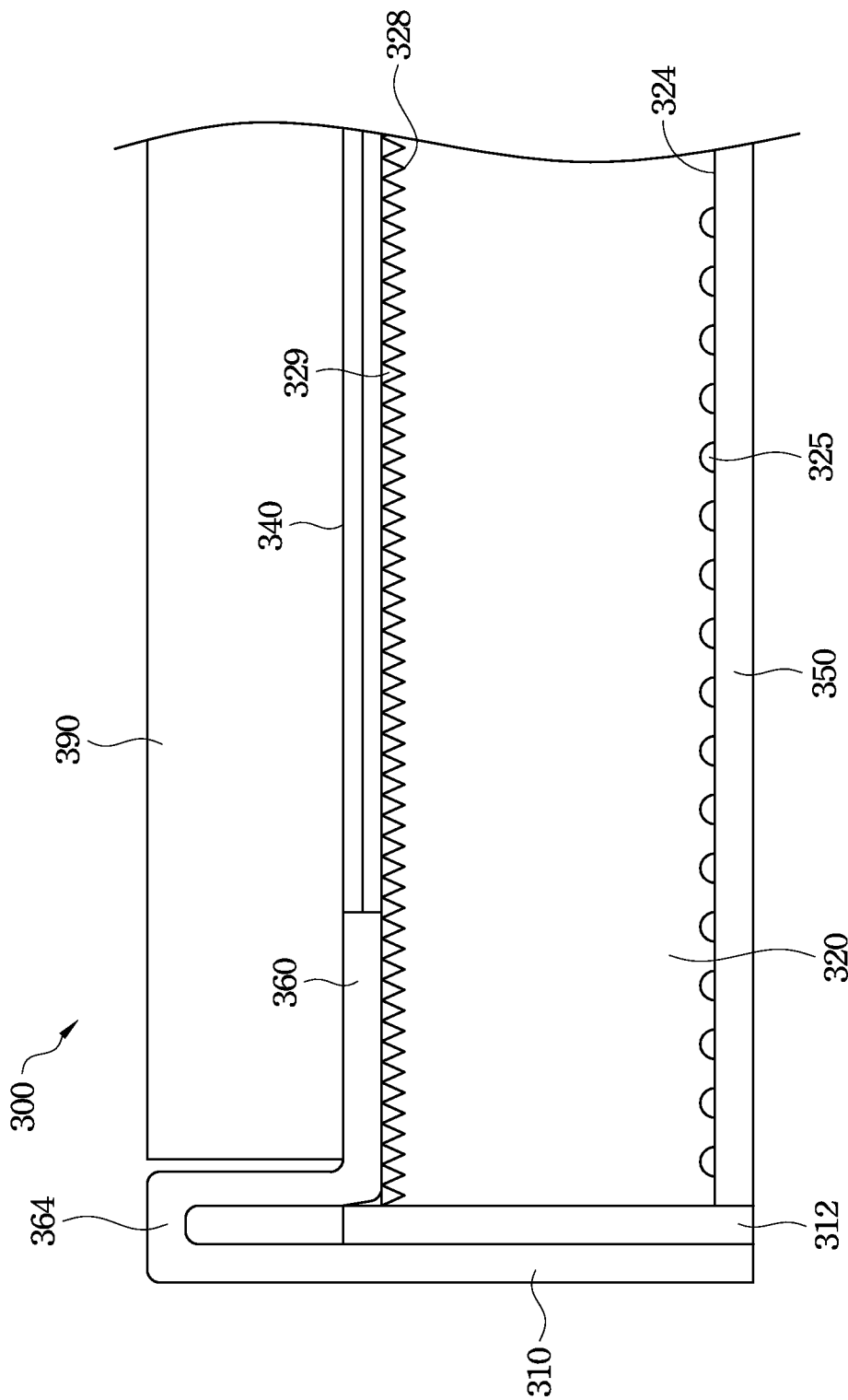
FIG. 7 is a cross-sectional view of the narrow border backlight module according to another embodiment of this invention, in which the position of the cross section is the same as in FIG. 5.

Reference is subsequently made to FIG. 7. FIG. 7 is a cross-sectional view of the narrow border backlight module according to another embodiment of this invention, in which the position of the cross section is the same as in FIG. 5. The bending of the protrusion 360 is larger than that of the protrusion 360 in FIG. 6, that is, the protrusion 360 extends upwards and then is bent. Therefore, a protruding portion 364 is formed in the upper part of the frame 310, and the protruding portion 364 protrudes and is higher than the optical film 340. Compared with the previous embodiment, in this embodiment, a display panel 390 can be fixed more stably. Specifically, when the display panel 390 is placed on the narrow border backlight module 300, the display panel 390 can be fixed by abutting the display panel 390 against one side of the protruding portion 364. Such a configuration is convenient for assembly and requires no additional fixing structure.

Figure 8A:
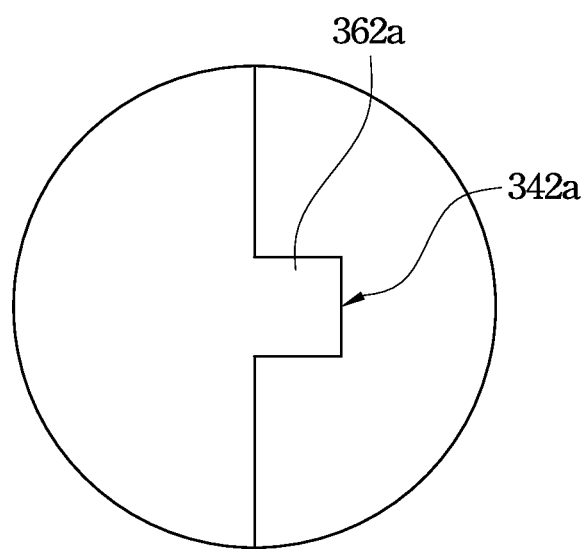
FIG. 8A to FIG. 8E are schematic views of engagement of a first engaging portion and a second engaging portion of the narrow border backlight module according to different embodiments.
Figure 8B:
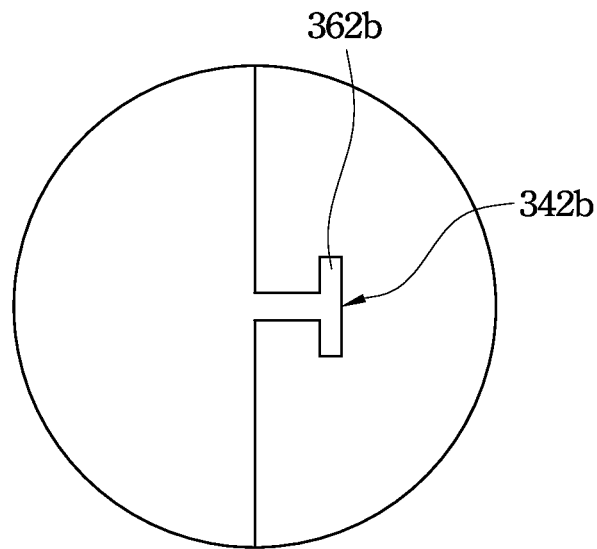
Figure 8C:
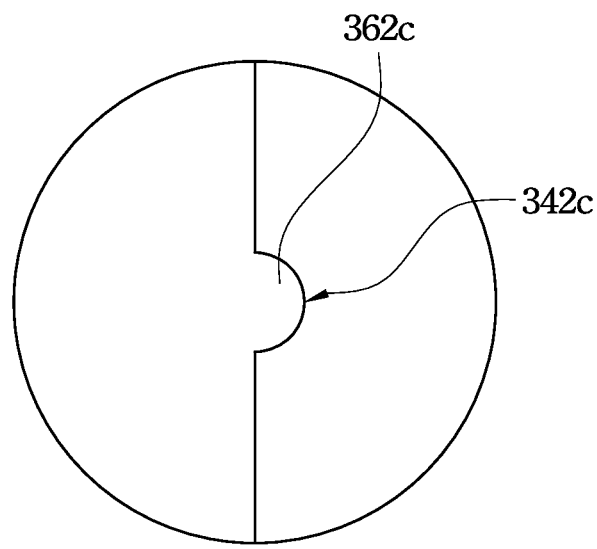
Figure 8D:
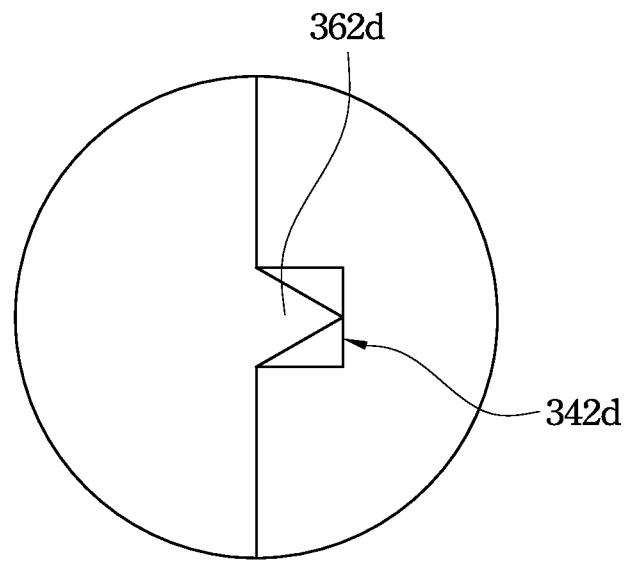
Figure 8E:
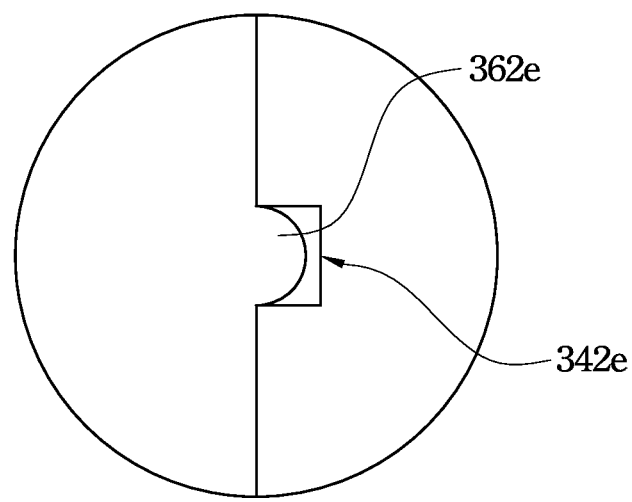

Reference is now made to FIG. 8A to FIG. 8E. FIG. 8A to FIG. 8E are schematic views of engagement of the first engaging portion and the second engaging portion of the narrow border backlight module according to different embodiments. As shown in FIG. 8A, the first engagement portion 362a is a rectangular protruding structure, and the second engagement portion 342a is a rectangular notch, such that the first engagement portion 362a can be engaged with the second engagement portion 342a. In FIG. 8B, the first engagement portion 362b is a T-shaped protruding structure, and the second engagement portion 342b is a T-shaped notch. In FIG. 8C, the first engagement portion 362c is a semicircular protruding structure, and the second engagement portion 342c is a semicircular notch. In FIG. 8D, the first engagement portion 362d is a triangular protruding structure, and the second engagement portion 342d is a rectangular notch. The first engagement portion 362d partially contacts the second engagement portion 342d, and the fixing function is still achieved. Similarly, in FIG. 8E, the first engagement portion 362e is a semicircular protruding structure, and the second engagement portion 342e is a rectangular notch. The first engagement 362e partially contacts the second engagement 342e, and the fixing function is still achieved.

Through the insert molding process, in addition to integrally forming the light guide element in the frame, so that the bent strip-shaped metal sheet 200 is fixed and welding is not required for fixing, by designing the mold in advance, a receiving space and microstructures on the bottom surface are formed together in the light guide element, so as to integrate the manufacturing process and reduce assembly time. Moreover, the thickness of the frame of the backlight module made by the method is simply the thickness of the sheet, so that the thickness of the frame of the backlight module is effectively reduced. Additionally, a reflective isolation layer is disposed on the inner surface of the frame, so as to effectively prevent short circuits resulting from direct contact between the circuit on the display panel and the metal frame.

Although the present invention has been described in considerable detail with reference to certain embodiments thereof, other embodiments are possible. Therefore, their spirit and scope of the appended claims should no be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A narrow border backlight module comprising:
   a frame comprising a plurality of sidewalls connected to each other, wherein a bottom of the frame is hollow, the sidewalls define a cavity, and the frame is made of metal;
   a reflective isolation layer disposed on an inner surface facing the cavity of the sidewalls;
   a light guide element formed inside the frame, wherein the light guide element and the frame are integrally formed;
   a protrusion connected to the frame and horizontally disposed on the light guide element, wherein the protrusion comprises a first engaging portion, and the protrusion is made of metal; and
   at least one optical film, the optical film comprises a second engaging portion corresponding to the first engaging portion, and the optical film is fixed on the light guide element by engaging the first engaging portion and the second engaging portion.

2. The narrow border backlight module of claim 1, wherein a receiving space is defined between one side surface of the light guide element and the frame, and the narrow border backlight module further comprises a light emitting unit disposed in the receiving space.

3. The narrow border backlight module of claim 1, wherein the light emitting unit comprises a circuit substrate and a plurality of light emitting diodes on the circuit substrate, the receiving space comprises a plurality of grooves, and the light emitting diodes are respectively disposed in the grooves.

4. The narrow border backlight module of claim 1, wherein a thickness of the light guide element is smaller than a height of the frame.

5. The narrow border backlight module of claim 1, wherein the light guide element comprises a light exiting surface and a bottom surface opposing the light exiting surface, and the light guide element further comprises a plurality of microstructures disposed on the bottom surface.

6. The narrow border backlight module of claim 5, wherein the narrow border backlight module further comprises a reflective layer disposed on the bottom surface.

7. A method for manufacturing a narrow border backlight module, the method comprising:
   providing a strip-shaped metal sheet, wherein a reflective isolation layer is disposed on a surface of the strip-shaped metal sheet;
   bending the strip-shaped metal sheet to form a frame, wherein the frame is an enclosed structure, a bottom of the frame is hollow, and the frame defines a cavity;
   putting the frame into a mold;
   injecting a polymeric light guide material into the mold and the cavity, so as to integrally form a light guide element in the frame;
   separating the frame integrally formed with the light guide element from the mold;

bending a protrusion connected to the strip-shaped metal sheet, so as to horizontally dispose the protrusion on the light guide element; and fixing an optical film on the light guide element by engaging a first engaging portion of the protrusion and a second engaging portion of the optical film.

8. The method for manufacturing the narrow border backlight module of claim 7, wherein the mold comprises a microstructure mold having microstructures, so as to form plurality of microstructures corresponding to the microstructures of the microstructure mold on a bottom surface of the light guide element.

9. The method for manufacturing the narrow border backlight module of claim 7, wherein the mold comprises a mold protrusion, so as to form a receiving space between a side surface of the light guide element and the frame, and a light emitting unit is accommodated in the receiving space.

* * * * *